United States Patent Office.

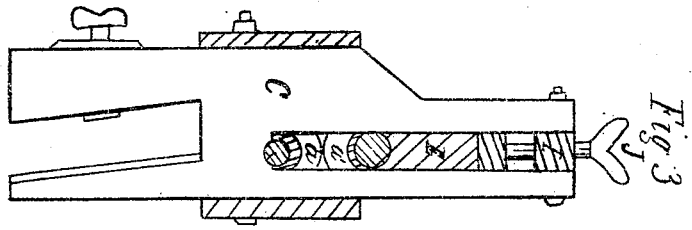
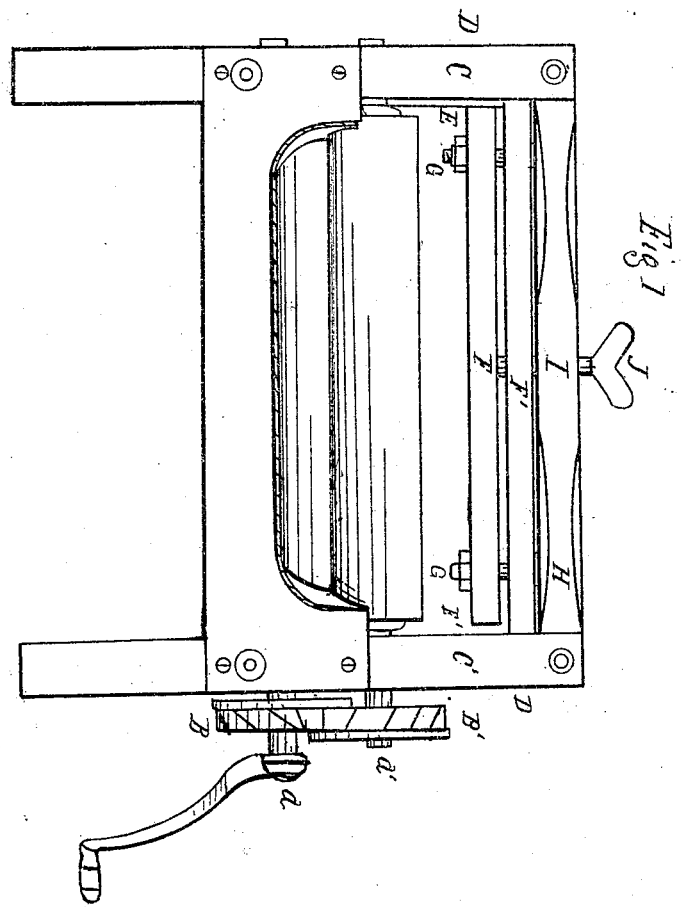
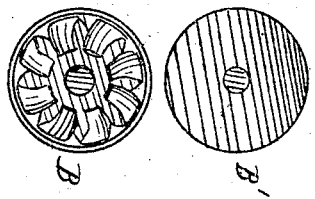

ROBERT B. HUGUNIN, OF CLEVELAND, OHIO.

Letters Patent No. 75,425, dated March 10, 1868.

---

IMPROVED CLOTHES-WRINGER.

---

The Schedule referred to in these Letters Patent and making part of the same.

---

TO ALL WHOM IT MAY CONCERN:

Be it known that I, ROBERT B. HUGUNIN, of Cleveland, county of Cuyahoga, State of Ohio, have invented a new and useful Improvement in Clothes-Wringers; and I do hereby declare that the following is a full, clear, and exact description of the same, reference being had to the accompanying drawings, making a part of this specification.

This invention consists in the application of helical gearing to the shafts of wringing-machines, either single or in duplicate, on one or both ends of the said shafts, with stops to hold the gear in adjustment, the same arranged substantially as hereinafter described, &c.

Figure 1 shows a wringer complete, with helical-gearing improvements applied to it.

Figure 2, helical gearing.

Figure 3, end view of wringer.

Similar letters of reference indicate corresponding parts in all the drawings.

To enable those skilled in the art to fully understand my invention, I will proceed to describe its construction and operation.

In the drawings, A and A' represent the shafts of two rollers used in a wringing-machine; B and B', right and left helical gear-wheels securely attached to the shafts A and A'; C and C', end-pieces of the frame, in which the rollers work; D and D', slots in the end-pieces C and C'; E and E', journal-blocks, resting on the journals of the upper shaft; F and F', spring-bars, the upper one of which rests on the tops of the journal-blocks E and E'; G and G', common bolts, used to connect the springs together loosely; H, small projection, block, or rubber, secured on the top of the spring-bar F, near the end, used as a stop to prevent the gearing from getting out of adjustment. A screw passing down through the stiffening-piece would answer the same purpose at this point. I, stiffening-piece, extending across the top of the frame, with its ends securely bolted in the slots D and D'. J, adjusting-screw, passing through the stiffening-piece I, then down loosely through the upper spring-bar, to the lower one, where its point rests. By means of this screw the pressure upon the rollers in wringing is regulated.

In operation, this wringer is used the same as any other, the advantage being in the constant contact of the teeth of the gear-wheels, and the absence of the jerking motion, as when the said contact is not continuous.

Having thus described my invention, what I claim, and desire to secure by Letters Patent, is—

I claim the arrangement of the right and left helical gear-wheels B and B', in combination with the elastic rollers A and A', end-pieces C and C', journal-blocks E and E', spring-bars F and F', stop H, and adjusting-screw J, substantially as and for the purposes specified.

R. B. HUGUNIN.

Witnesses:
JOHN S. HOLLINGSHEAD,
JOHN D. BLOOR.